Patented Apr. 16, 1929.

1,709,569

UNITED STATES PATENT OFFICE.

SERGE DE PROCOUDINE-GORSKY AND NICOLAS POZNIAKOW, OF NICE, FRANCE, ASSIGNORS TO SOCIÉTÉ DE PHOTOCHIMIE "ELKA," OF NICE, FRANCE.

PROCESS FOR RENDERING GELATIN INSOLUBLE AND ITS APPLICATION TO VARIOUS ARTS.

No Drawing. Application filed November 11, 1925, Serial No. 68,460, and in France November 19, 1924.

This invention relates to rendering gelatin insoluble and the application of the resultant product to various arts.

According to this invention a pure gelatin is intimately mixed with silver halid prepared separately and containing no trace of colloidal substances. The mass thus obtained possesses a property such that, wherever the silver halid is subsequently reduced by any known process, the gelatin is insoluble; such solubility being proportional to the quantity of the silver halid reduced. Per contra, wherever the silver halid remains intact and pure and not reduced, the gelatin remains soluble in water and may be eliminated by merely washing the mass with, for example, hot water.

One of the most important properties of the mass of gelatin and silver halid treated by reducing the silver and then washing, will be set out hereinafter.

Suppose, for example, that there is present a layer of gelatin and silver halid, and that the silver halid employed is in places more or less completely reduced (by exposure, for example, and then a treatment with suitable developers), there is obtained, after washing with hot water, a layer whose thickness of gelatin will also vary in places, such thickness being greatest wherever the reduction of the silver halid is complete and least wherever the silver halid remains intact, and moreover, throughout proportional to the degree of reduction of the silver halid.

A layer is then obtained which will contain more or less marked reliefs which show the places where exposed silver halid has been more or less reduced.

In order to prepare such mixture of gelatin and silver halid, it is necessary to start from separately prepared pure products.

The invention may be illustrated in the following example:—

The two solutions following are prepared separately:—

Solution A.

| | Grams. |
|---|---|
| Chemically pure silver nitrate | 20 |
| Distilled water | 200 |

After solution of the silver nitrate, ammonia water is added in small doses until solution of the brown precipitate produced and until the solution again becomes completely transparent.

Solution B.

| | |
|---|---|
| Pure photographic gelatin | 1½ grams. |
| Distilled water | 200 grams. |
| Chemically pure potassium bromide | 18 grams. |
| Absolute alcohol | 30 cm³. |

This solution is heated to 40° C. and then allowed to cool to 30° C.

The preparation of both these solutions may be made in daylight.

Solution A is now heated to a temperature of 30° C. and is then added in small doses and with continuous agitation to solution B operating in a dark room with red light.

The vessel containing a mixture thus obtained is placed upon a water bath at 38° C. It is then covered and allowed to cool as slowly as possible, thoroughly agitating every ten minutes.

The mixture is then placed in a centrifugal apparatus of any suitable type, which is then placed in movement. Pure ripened silver bromide is then obtained and it is then only necessary to wash it with water.

40 grams of pure photographic gelatin are taken separately and thoroughly washed several times with very cold distilled water.

After elimination of the excess water by the aid of pressure, for example, the silver bromide previously obtained is added to the gelatin.

The gelatin and silver bromide are intimately mixed together for the purpose of distributing the latter as uniformly as is possible throughout the mass. The vessel containing them is then placed in hot water at a temperature of 45° C. and the mass is fused while agitating carefully.

If the entire mass seems to occupy less than 600 cm³, distilled water is added to bring it up to this measure. The whole is carefully mixed, filtered, and the emulsion of gelatin and silver bromide is ready to be cast in any shape desired, according to the use for which it is destined. It is preferable, moreover, not to cast at once, but to leave it in a cool place until use; it is then remelted at a temperature not exceeding 40° C. again filtered and cast.

It will at once be seen to what numerous applications the process may be put.

It allows, firstly, a sensitive photographic emulsion to be prepared which, applied on plates, films, papers or other suitable backings, will allow images in relief to be obtained, which are insoluble in hot water and formed of a combination of gelatin and reduced silver.

The emulsion obtained by the process hereinbefore described and applied upon paper, for example, (the paper being exposed by any known means) it is developed with pyrogallol or with pyrocatechin in such a manner as to obtain a proof which is wholly or partially insoluble, wherever the reduction of the silver halid has not been effected more or less strongly. The proof obtained is in its unfixed and unwashed state then applied face downwards upon a clean and polished surface, such as glass, metal, celluloid, etc. (by the aid of an india rubber scraper, for example,) then placed in water having a temperature of 45° to 55° C. It will then be seen that wherever the gelatin has not been rendered insoluble, the emulsion runs beyond the edges of the paper and is dissolved in the water. By raising an edge of the paper, the latter can easily be removed, the image in relief remaining wholly upon the support, washing is continued until complete removal of the soluble emulsion. The image is then fixed in the usual manner for removing the silver halid retained in the insoluble gelatin.

One may also, after developing, and after allowing the developer to drain off, rapidly plunge the unwashed proof in an ordinary 20% fixing agent, for example, which is replaced after two or three minutes by a fresh fixing agent. The paper is left for about 15 minutes in the bath, washed in running water, allowed to dry and the proof again placed in cold water and then applied upon a backing and then operating as above described.

The image will adhere very strongly to the backing.

In this latter operating method, the unreduced silver is eliminated by the fixing and the insoluble gelatin and the reduced silver remain in the sensitive layer, the soluble portion of the gelatin being removed by the hot water.

In both cases the image obtained presents a very considerable relief.

It may be remarked that the exposure of the sensitive layer is here almost instantaneous, contrary to that produced with sensitized layers, in which bichromates are employed to render the gelatin insoluble.

The sensitized layer obtained in accordance with the present invention permits also of the making of enlargements.

The image in relief, obtained as above described, and which is easily transferable from one support to another, may, in particular, be transferred upon a metal plate, in order to obtain engraved plates for printing, advertisements, etc. The plates thus obtained possess a remarkable fineness hitherto unobtainable. The fineness of the grain may be pushed to its maximum degree, and regularity of etching is perfect. This process is also applicable to rotary photo-printing, to zincography and all other photo-mechanical processes (even for polychrome reproductions). Generally speaking, the image in relief may be transferred to any support in view of any subsequent treatment desired.

The transferred image in relief will retain its exact dimensions.

Bleached in the ordinary manner by potassium bichromate or potassium ferricyanide, and then fixed, the proof may be coloured by saturation or by formation of insoluble lakes (colour photography).

Finally, in accordance with this invention, the gelatin rendered insoluble by this process may be employed for producing articles, low reliefs, etc. by direct photography from the mass of gelatin, the gelatin which has remained insoluble being eliminated by washing.

In order to allow of the ready observation of the degree of the etching on a sheet of metal when producing a printing plate, which is difficult to see because of the gelatin being rendered black by the presence of reduced silver, the sensitized layer may be coloured by the addition, at any period, of colouring matter.

The colouring matter may be one which does not produce any chemical action upon the silver halid and is readily assimilated by and distributed uniformly throughout the sensitized layer. It should also be transparent to the light of the laboratory, in which the development of the sensitized layer is effected, in order to allow of its control.

It has been found that the best tint to give to the sensitized layer is a red tint, which may be obtained by the aid of any red colouring matter, in particular, aniline reds.

Other colours may, however, be employed, in accordance with the use to which the sensitized layer is to be applied.

It has moreover been observed that a red coloration of the sensitized layer has for effect substantially to attenuate the action of the light on the sensitized layer, during its exposure, and thus to diminish the magnitude of the reliefs.

By tinting the sensitized layer in red, reliefs will be obtained which are less prominent and soft, and, moreover, the bite process when making printing plates is more easily followed.

Claims:

1. A process of preparing insoluble gelatin relief images which consists in preparing ripened silver halide substantially free from colloidal substances, mixing the silver halide with dissolved pure gelatin to form a light sensitive emulsion, exposing the emulsion variously at predetermined points of its surface, subjecting the emulsion to the action of a developer to reduce the exposed silver halide therein, and washing out the undeveloped portions of emulsion and halide.

2. A process of preparing insoluble gelatin relief images which consists in preparing ripened silver halide substantially free from colloidal substances, mixing the pure ripened silver halide with pure gelatin to form a light sensitive emulsion, combining the emulsion with a material adapted to color the gelatin, exposing the emulsion variously at predetermined points of its surface, subjecting the emulsion to the action of a developer to reduce the exposed silver halide therein, and washing out the undeveloped portions of emulsion and halide.

3. A process for the manufacture of photographic proofs, in relief, which consists in mixing pure gelatin with separately prepared ripened silver halide, placing the mixture upon a backing, exposing to light, developing, transferring upon another support and washing out the soluble gelatin.

4. A process of preparing insoluble gelatin relief images which consists in combining the gelatin with ripened silver halide substantially free from colloidal substances, forming a body therefrom, exposing the said body at predetermined intensities at different parts of its surface, reducing the exposed silver halide to produce a local insolubilization of said gelatin, and washing out the soluble gelatin emulsion and unexposed silver halide.

In testimony that we claim the foregoing as invention, we have signed our names this 24th day of October, 1925.

SERGE DE PROCOUDINE-GORSKY.
NICOLAS POZNIAKOW.